United States Patent [19]
Sutch

[11] 3,973,689

[45] Aug. 10, 1976

[54] CONTAINERS

[75] Inventor: Brian Leo Chudleigh Sutch, Thames Ditton, England

[73] Assignee: Airfix Industries Limited, London, England

[22] Filed: June 21, 1974

[21] Appl. No.: 481,878

[30] Foreign Application Priority Data

June 22, 1973 United Kingdom............... 29855/73

[52] U.S. Cl................................. 215/317; 428/81
[51] Int. Cl.² ......................................... B65D 41/18
[58] Field of Search ........... 215/316, 317, 359, 249, 215/324, 246; 220/359

[56] References Cited
UNITED STATES PATENTS

| | | | |
|---|---|---|---|
| 2,077,985 | 4/1937 | Bukolt ............................... | 215/316 |
| 3,493,458 | 2/1970 | Santangelo......................... | 161/103 |
| 3,782,575 | 1/1974 | Braun ................................ | 215/317 |

Primary Examiner—Ro E. Hart
Attorney, Agent, or Firm—Scrivener, Parker, Scrivener and Clarke

[57] ABSTRACT

A composite product made of a blank of e.g. paper, card, plastics or metal foil, and a peripheral injection moulding of synthetic plastics material, formed on the periphery of the blank. The blank is formed adjacent its periphery to form a channel in which the inner region of the moulding engages the outer region extending from the inner region in the direction in which the internal surfaces of the channel face. Shrinkage of the moulding will tend to cause the blank to bow in the direction in which the channel faces.

5 Claims, 1 Drawing Figure

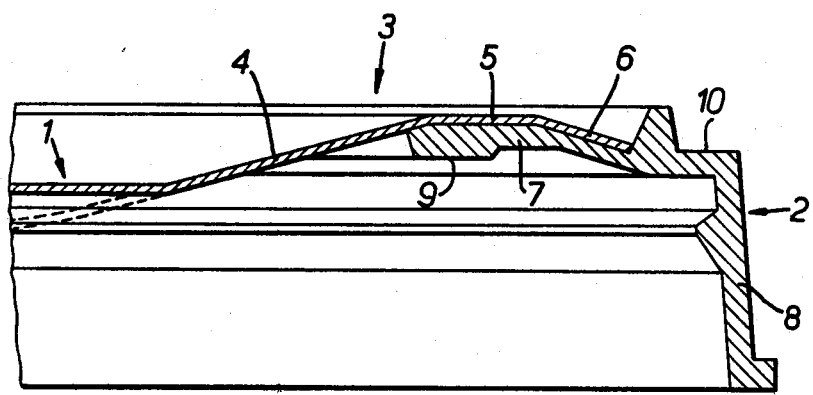

CONTAINERS

The present invention relates to improvements in composite products which comprise a piece of flexible sheet material, such as of paper, card, synthetic plastics or metal foil or a laminate thereof, and an injection moulded portion moulded on to the sheet material.

In particular the invention relates to such products in which a panel of sheet material is surrounded by a peripheral injection moulding such as a rim or connecting portion. Such products include lids.

According to the present invention there is provided a method of making a composite product in which a peripheral moulding of synthetic plastics material is formed on the margin of and extends about a panel of flexible material, the panel being deformed at the margin to define there a peripherally extending channel internally engaged by an inner marginal part of the moulding from the outer region of which and from the plane of the panel extends a second part of the moulding, shrinkage of the moulding tending to bow the central part of the panel in the direction in which the channel faces.

The inner part of the moulding preferably engages the inner surfaces of the sides and base of the channel. The second part of the moulding preferably extends in the direction in which the channel faces.

In order that the invention may be well understood there will now be described an embodiment thereof, given by way of example only, with reference to the accompanying drawing which is part of a diametrical section through an embodiment of round lid according to the present invention.

As shown in the drawing, the lid comprises a round main panel 1 of flexible sheet material and a peripheral injection moulding of synthetic plastics material. The marginal portion 3 of the panel is displaced out of the plane of the panel so as to have a generally channel section comprising an inner leg 4 extending, as shown, at an angle of about 15° to the plane of the panel, a planar intermediate or base part 5 extending generally parallel to the plane of the panel and an outer leg 6 extending, as shown, at an angle of about 16.5° to the plane of the panel.

The peripheral injection moulding 2 comprises an inner marginal portion 7 affixed to the inner surface of the outer leg 6, the base 5 and to a portion of the inner surface of the inner leg 4, and a dependent flange 8 suitably shaped for engagement with the peripheral lip of a container and extending from the inner marginal part in the direction in which the channel faces.

The moulding 2 and the panel marginal portion 3 are so shaped and dimensioned that, on shrinkage of the moulding 2, the panel 1 will be caused to bow in the direction of leg 4 and in which the channel faces, as indicated in broken lines.

The lid is produced in a mould cavity defined between co-operating core and cavity tools and comprising a part in which the panel is trapped and a part defining the peripheral moulding and into which the marginal portion of the panel extends. The panel 1 is fed to the mould tools as a planar piece of sheet material and the marginal portion 3 is displaced to its final configuration both by the action of the core and cavity tools in trapping the panel and by injection of plastics material to form the moulding 2.

Because of the generally channel shaped configuration of the marginal portion of the panel which is engaged by the inner margin of the moulding and the direction in which the second part of the moulding extends in relation to the direction in which the channel faces the lid has good strength against radial deformation and bending about a diameter.

The flange 8 may extend in the opposite direction to that in which the channel faces but it appears that if it does, the lid will much more readily deform in the direction of the bow if, on handling, the free edges of the flange are urged together across the width or diameter of the lid. With the flange extending in the direction in which the channel faces, the girder structure represented by the channel and the plastics in the channel and the L-section configuration of the moulding, a sturdy lid is achieved. It appears furthermore that the bowed configuration which the panel adopts on shrinkage of the moulding acts in opposition to inward pressure on the flanges thereby contributing to the strength of the lid.

The channel provides a suitable location for a preferred flow path of the plastics during injection. Thus the mould tools define a channel 9 which is thicker than the remainder of the cavity which is to receive plastics and the pin gates may open into this channel. When a blank is trapped between the tools, and plastics are injected, the plastics will flow along the channel 9 before flowing outwards up leg 6. Thereby the sheet is held by plastics in the channel against the tool surface on the face opposite the channel and this effect spreads first peripherally along the channel and then outwardly along the leg. If this precaution is not taken the plastics may flow initially from a pin gate outwardly along the leg and then along the outer edge of the leg. If this happens plastic may get behind the free edge of the leg where it disfigures the outer face of the lid.

It is also desirable that the lid should initially be of increasing overall dimension along the flange toward the free edge of the flange so that upon shrinkage the free edge of the flange progresses inwards to position the free edge under step 10 whereby lids may be stacked in register.

The drawing illustrates in fact an enlarged view of a circular lid of 3.403 inches internal diameter at the root of flange 8.

The plastics may extend inwardly over the junction between the inner side of the channel and the main panel to inhibit excess opening of the angle at the injunction and thereby excess bowing of the panel. If desired the pin gates may be positioned inwards of the inner edge of the channel, a recess being provided in the face of the tool opposite the pin gate. Thereby the sheet may be protected from very high pressure at the pin gate, being displaceable locally into the recess, and a hot spot may be maintained at the pin gate for good flow characteristics. The region of each pin gate may then communicate with the flow channel along an outwardly directed path of any desired configuration.

What we claim is:

1. A composite lid or the like comprising a panel of flexible sheet material in generally planar form but deformed at its margin to define there a peripherally extending channel having inner and outer legs interconnected by an intermediate part, and a molding of synthetic plastics material bonded to the margin by formation thereon and extending about that margin, the molding including an inner part which extends into the channel and is bonded to the bottom surface of the inner and outer legs and the intermediate part of the channel, said molding having an outer part which extends from the inner part thereof which is in the channel of the blank in the direction in which the channel opens, the panel inwardly of the channel being bowed in the direction in which the channel opens by displacement of the inner part due to shrinkage of the molding.

2. A composite lid or the like according to claim 1 wherein the intermediate part of the channel is flat and the inner and outer legs are inclined relative to said intermediate part.

3. A composite lid or the like according to claim 1 in which the panel is circular.

4. A composite lid or the like according to claim 1 in which the lid or the like is a closure for a container, the second part of the moulding having a cross-sectional shape adapted to engage a lip of a container.

5. A composite lid or the like according to claim 1 in which the inner part of the moulding includes a region of enlarged cross-section extending peripherally of the panel and a region of reduced cross-section extending outwardly from the region of larger cross-section to the edge of the panel.

* * * * *